Patented Nov. 11, 1930

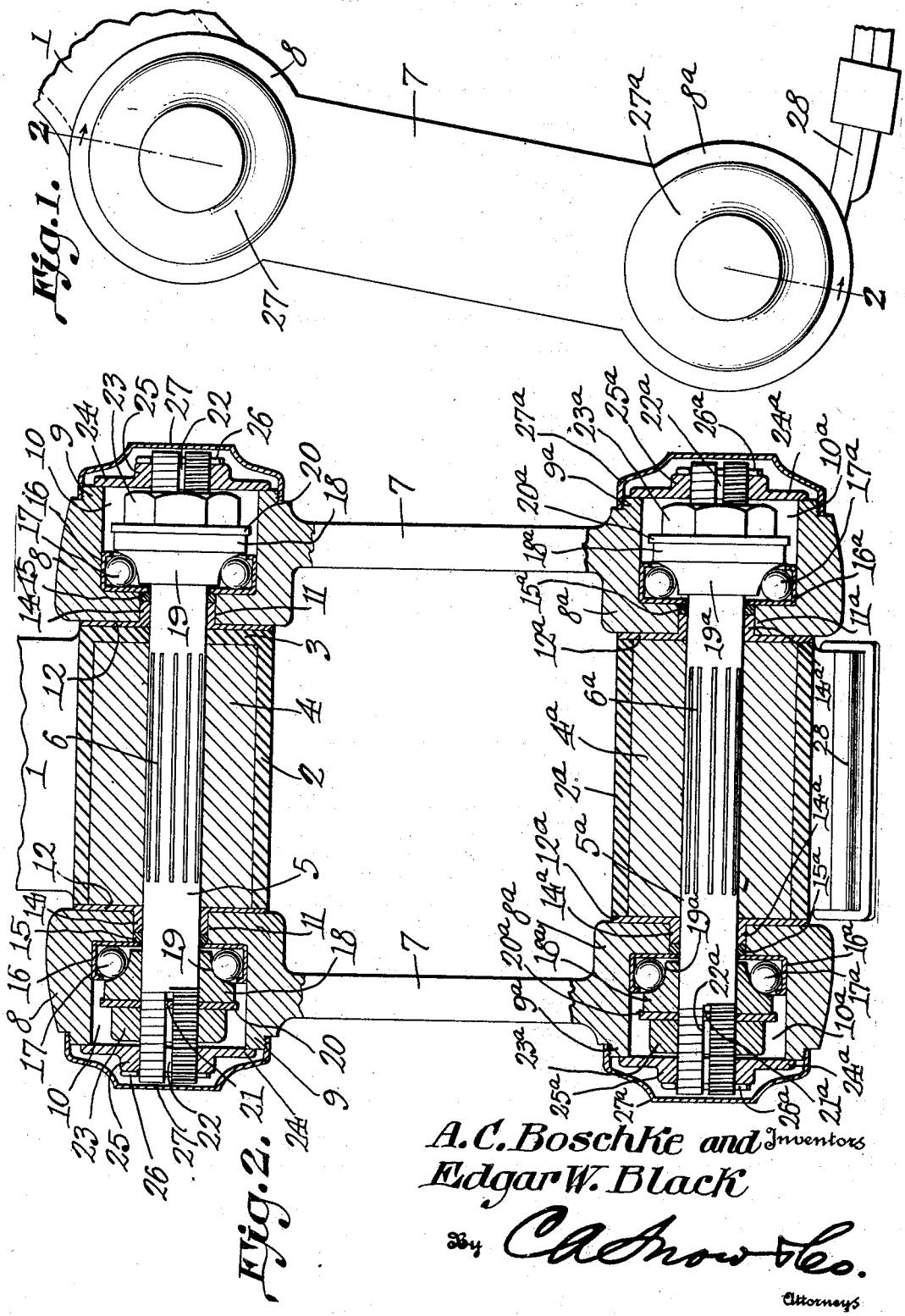

1,781,627

UNITED STATES PATENT OFFICE

ALBERT C. BOSCHKE AND EDGAR W. BLACK, OF LOS ANGELES, CALIFORNIA

SHACKLE

Application filed February 13, 1928. Serial No. 253,999.

By way of explanation, it may be stated that the shackle bolts that connect the springs of an automobile with the frame very often bind with respect to the shackles, the free relative movement of the body of the vehicle with respect to the springs being impaired. A loose shackle bolt results in an objectionable bumping noise, and a tight shackle bolt not infrequently results in a broken spring. These disadvantages being understood, it may be stated that the present invention aims to provide novel means whereby the shackles may be assembled with the shackle bolts in an automobile.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in side elevation, a portion of the shackle mechanism of an automobile, wherewith the device forming the subject matter of this application has been assembled; and Figure 2 is a section taken approximately on the line 2—2 of Figure 1.

The numeral 1 marks a frame of an automobile, provided with a socket 2 having an end wall 3. A bushing 4 is located in the socket 2. A shackle bolt 5 passes through the bushing 4 and through the end wall 3. The shackle bolt 5 has the usual longitudinal grooves 6 disposed within the bushing 4. Shackles 7 are shown and are provided at their ends with heads 8, each head having a reduced neck 9. In the head 8 is formed a chamber 10, and the head 8 has a reduced bore 11 communicating with the inner end of the chamber 10. Disks 12 are located at the ends of the socket 2, the disks having reduced hubs 14 received in the bores 11. In each of the bores 11 is located a filler 15, in the form of a washer, located at the end of the corresponding hub 14.

Within the chamber 10 of the head 8 is located a ball cage 16 of any desired construction, abutting against the head 8 at the inner end of the chamber 10. The ball cage 16 retains balls 17. Bearings 18 are mounted on the shackle bolt 5 and are located within the chambers 10. The bearings 18 have tapered parts 19 that cooperate with the balls 17. Washers 20 are mounted on the shackle bolt 5 outwardly of the bearings 18 and abut against the outer surfaces of the bearings 18. The washers 20 have cross bars 21 engaged in slots 22 formed in the ends of the shackle bolt 5. Nuts 23 are threaded on the shackle bolt 5 and engage the washers 20 to hold the washers 20 and the bearings 18 in place. Closure plates 24 for the outer ends of the chambers 10 are provided, the closure plates abutting against the outer surfaces of the heads 8 of the shackles 7. The closure plates 24 have hubs 25. Securing elements 26, such as cotter pins, are mounted in the shackle bolt 5, and engage the hubs 25 above the closure plates 24 to retain the closure plates in place. Caps 27 house the closure plates 24 and are threaded on the necks 9 of the heads 8.

The construction above described is used for connecting the upper ends of the shackles 7 with the frame 1 of the automobile. The lower ends of the shackles 7 are connected to the spring 28 in a like way. The parts hereinbefore described are designated, in connection with the lower ends of the shackles 7, by numerals previously used, with the suffix "a". The socket 2ª generally does not have the end wall 3 that is shown in connection with the socket 2.

The general construction of the device is such that the shackles can swing freely and readily with respect to the shackle bolts, and the disadvantages heretofore met with in connection with loose and banging shackle bolts, or shackle bolts that bind too tightly, will be done away with.

What is claimed is:—

In a device of the class described, a member having a reduced neck, said member being provided in one end with a chamber, and in the opposite end with a reduced bore communicating with the chamber, a disc having a reduced hub extended into the bore, a ball cage abutting against said member at the inner end of the chamber, a washer in the bore between the ball cage and the end of the hub of the disc, balls in the ball cage, a closure plate abutting against the end of the neck and having a hub, a shaft extended through the hubs, the washer, and the cage, there being a slot in that part of the shaft which is adjacent to the closure plate, a disc on the shaft and having a cross bar received in the slot, a tapered bearing on the shaft and cooperating with the balls, a nut threaded on the shaft, the disc being bound between the bearing and the nut, the bearing, the disc and the nut being located in the chamber, a securing element mounted in the shaft at the outer end of the hub of the closure plate, and a cap housing the closure plate and the corresponding end of the shaft, the cap surrounding the neck and being mounted on the neck.

In testimony that we claim the foregoing as our own, we have hereto affixed our signatures.

ALBERT C. BOSCHKE.
EDGAR W. BLACK.